Figure 3:
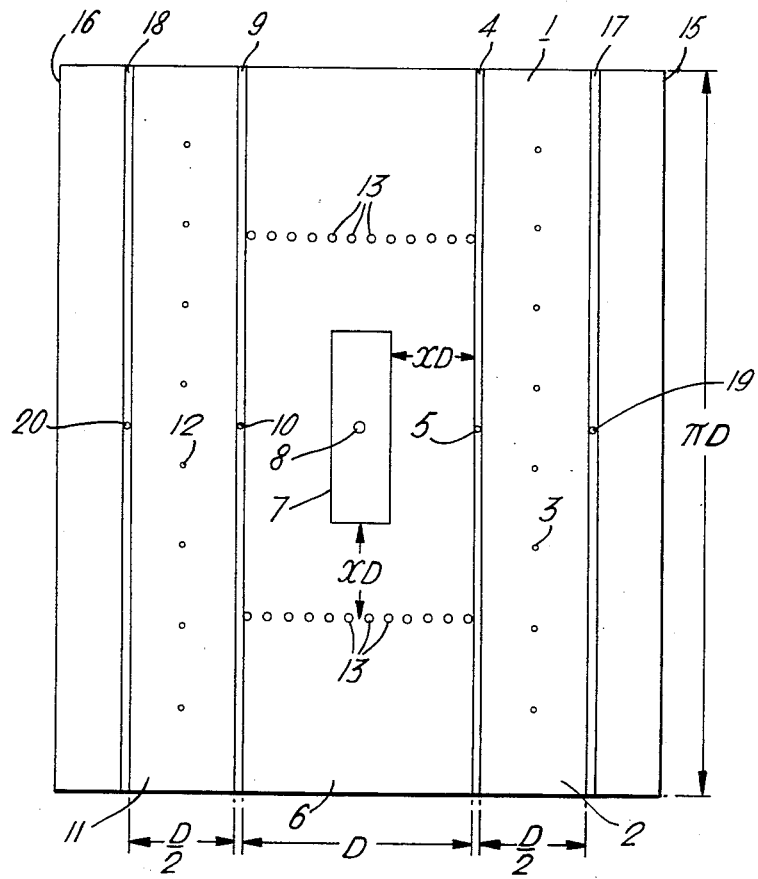

June 19, 1962 S. WHITLEY 3,039,830
JOURNAL BEARINGS
Filed Oct. 16, 1958 3 Sheets-Sheet 1
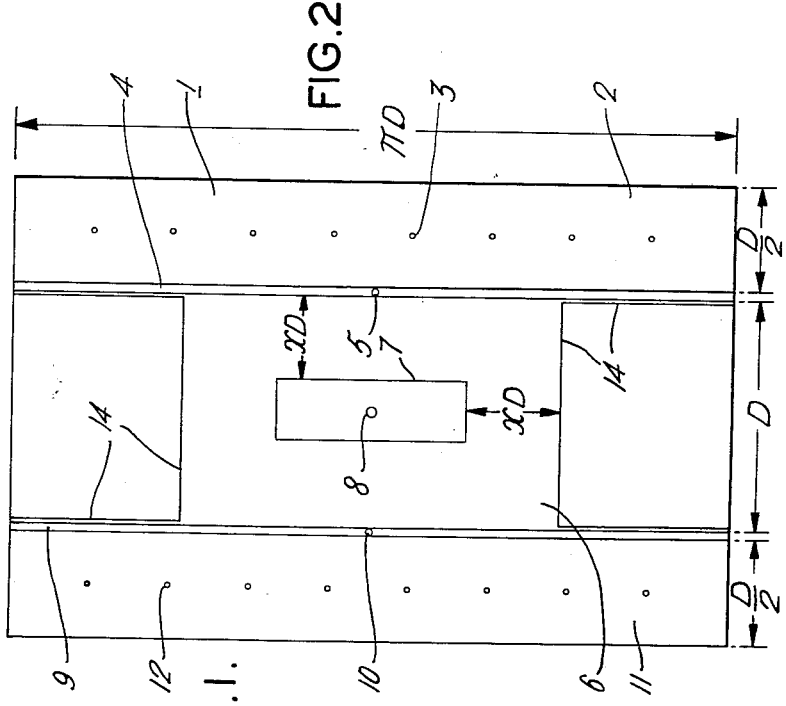
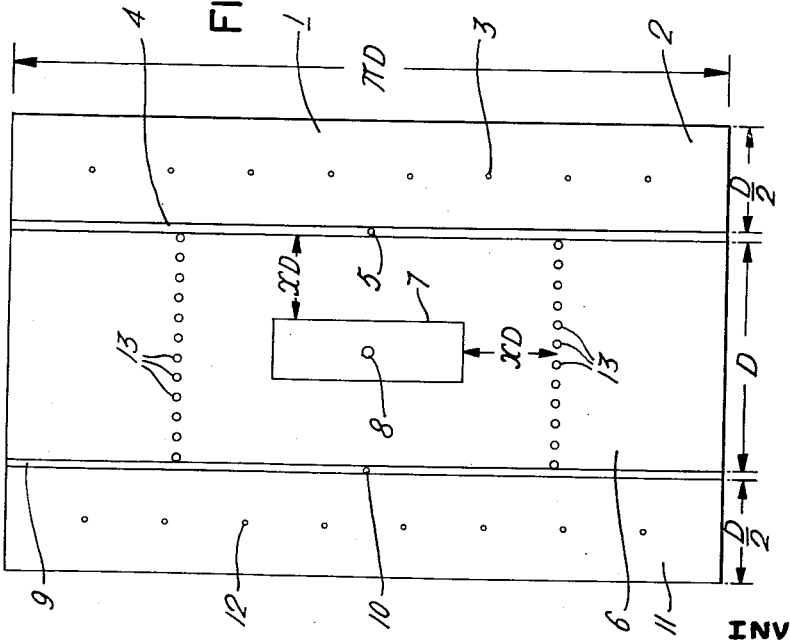
INVENTOR
*Stanley Whitley*
BY
*Larson and Taylor*

June 19, 1962  S. WHITLEY  3,039,830
JOURNAL BEARINGS

Filed Oct. 16, 1958  3 Sheets-Sheet 2

INVENTOR
Stanley Whitley
BY
Lawson and Taylor

June 19, 1962  S. WHITLEY  3,039,830
JOURNAL BEARINGS

Filed Oct. 16, 1958  3 Sheets-Sheet 3

Inventor:
Stanley Whitley
By Attorneys

3,039,830
JOURNAL BEARINGS
Stanley Whitley, Chester, England, assignor to the United Kingdom Atomic Energy Authority, London, England
Filed Oct. 16, 1958, Ser. No. 767,623
Claims priority, application Great Britain Oct. 18, 1957
6 Claims. (Cl. 308—9)

This invention relates to gas journal bearings.

In the field of supporting shafts in gas journal bearings, both hydrodynamic and hydrostatic forms are used. In hydrodynamic journal bearings a smooth shaft moves in a smooth sleeve, the lift to the shaft being imparted by the gas carried round by the movement of the shaft. Such bearings, however, have a very small load carrying capacity. In hydrostatic journal bearings, an external pressure source is used to supply a lifting gas pressure. One form of hydrostatic journal bearing is the externally pressurised orifice compensated type, that is, a gas journal bearing having a circumferential series of externally pressurised orifices and in which the downward displacement of the shaft consequent upon its loading serves to increase the pressure drop through the top orifices and reduce the pressure drop through the bottom orifices, thereby applying a lifting force to the shaft.

Externally pressurised orifice compensated journal bearings have a better load carrying capacity than the hydrodynamic bearing but their capacity is dependent upon shaft deflection from concentricity with the bearing which reduces running clearances. As running clearances are reduced, so the accuracy of manufacture, assembly and operation of bearings becomes more difficult.

Also in orifice compensated journal bearings there is poor utilisation of the external pressure. Typically, a four inch long by two inch diameter journal bearing with orifices one inch from each end of the bearing gives, with a deflection from concentricity of half the concentric radial clearance between shaft and journal bearing, a lift of 10% of that possible assuming that all the pressure had operated over all the projected area of the journal bearing.

It is an object of the invention to provide a hydrostatic gas journal bearing having a load carrying capacity in excess of that provided by an externally pressurised orifice compensated journal bearing of equivalent size and using equivalent power in supplying gas to sustain the bearing.

The hydrostatic gas journal bearing of the invention is characterised in having at least three portions in sequence along the bearing from one end of the bearing, the first being an externally pressurised orifice compensated journal bearing portion, the second being a circumferential groove with means for controlling the pressure in the groove and the third being a journal bearing portion having means for applying pressure which is circumferentially asymmetric.

A bearing according to the invention may also have fourth and fifth portions added in sequence, comprising respectively another circumferential groove with means for controlling the pressure in the groove an another externally pressurised orifice compensated journal bearing portion.

The means for applying circumferentially asymmetric pressure may be a hole above orifice size, a slot, or a pocket, in conjunction with an opening through the journal bearing on the side opposite the side in which the asymmetric pressure is applied. In general it is arranged that gas can be fed to the pocket whence it escapes with approximately equal impedance along two paths, one path to the circumferential groove or grooves and another path to said opening; the choice of hole, slot or pocket is governed by consideration of gas consumption and the cost of gas supplied, the pumping power required and the lift to be provided to the shaft.

Figure 4:
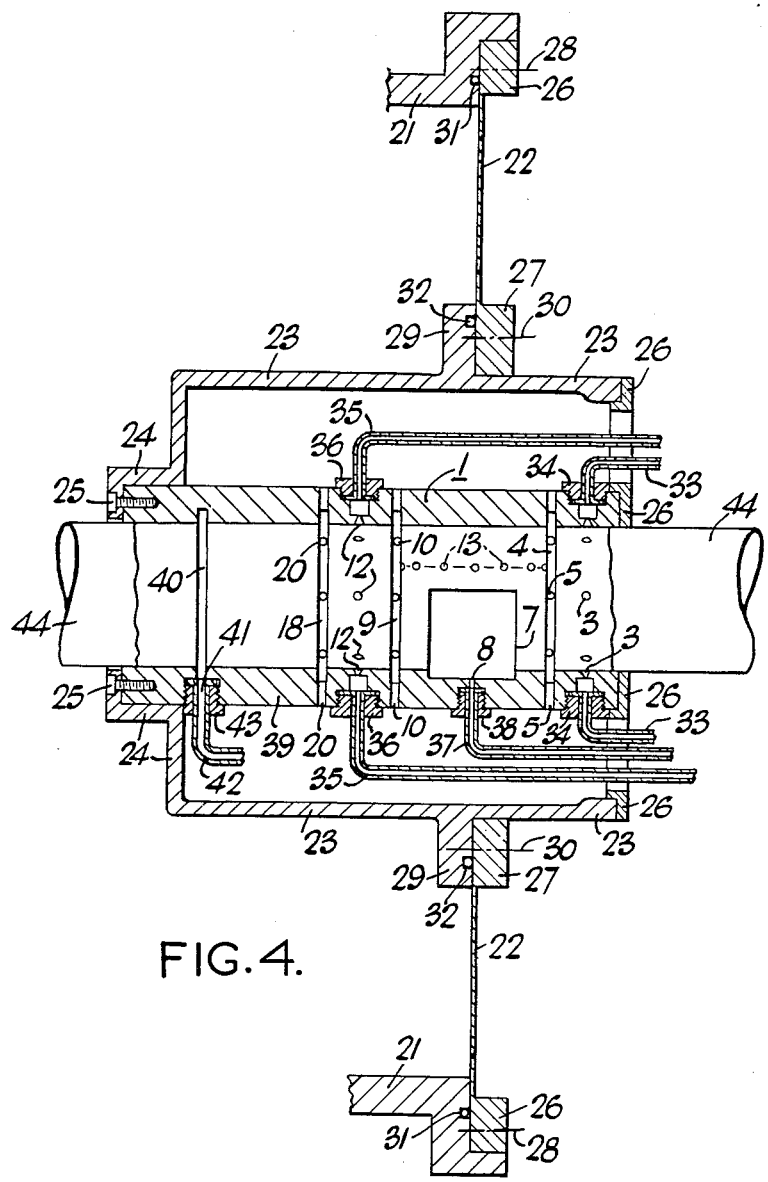

By way of example, the invention will now be described with reference to the accompanying drawings in which FIGURES 1 and 3 are developed views and FIGURE 4 is a sectional view.

In FIGURE 1 a journal bearing 1 has an orifice compensated journal bearing portion 2 fed by a series of externally pressurised orifices 3, a circumferential groove 4 having a vent hole 5 for controlling the pressure in the groove, a journal bearing portion 6 having a pocket 7 of 2.5 mm. depth (for a four inch long by two inch diameter journal bearing) supplied from a feed hole 8, another circumferential groove 9 having a vent hole 10 and another orifice compensated journal bearing portion 11 fed by a series of externally pressurised orifices 12. An opening comprising two rows of vent holes 13 is provided to create, in conjunction with the pocket 7, a circumferentially asymmetric pressure when the pocket is pressurised. Alternatively the journal bearing could be completely cut through to provide an opening as indicated by lines 14 (see FIG. 2 in which like parts to those shown in FIG. 1 are identified by the same reference numerals), but this tends to create difficulties with honing the bearing. The journal bearing has a diameter D which is made the same as the distance between the grooves 4 and 9.

It is preferable to keep the gas escape paths from the pocket 7 to the circumferential grooves 4 and 9 and to the holes 13 of equal length, as indicated by the two dimensions $xD$. The following table of horse power H.P. and loads W gives the effect of variation of $x$ for a journal bearing four inches long and two inches in diameter (i.e. projected area of 8 in.$^2$) for an assumed feed gas pressure applied to hole 8 of 100 p.s.i.

| $x$ | H. P. to feed pocket 7 | H. P. to feed both orifices 3, 12 | H. P. total | Maximum load capacity, (W) lbs. |
|---|---|---|---|---|
| 0.0 | "Infinite" | 0.60 | "Infinite" | 400 |
| 0.2 | 0.87 | 0.60 | 1.47 | 340 |
| 0.3 | .49 | 0.60 | 1.09 | 300 |
| 0.4 | 0.30 | 0.60 | 0.90 | 270 |

For comparison, an externally pressurised orifice compensated journal bearing as hereinbefore described in column 1, lines 34 to 40 would require 0.6 H.P. (H.P. to feed orifices as given in table above) and give a load capacity of 80 pounds (10% of 8 square inches (projected area of bearing) times 100 p.s.i. (applied pressure)) independent of speed. (The total bearing load for a hydrodynamic bearing of the same dimensions is about 32 lbs. at 6,000 r.p.m. in air, falling off at lower speeds.)

In use of the journal bearing 1 to support a rotatable shaft, the orifices 3, 12 are pressurised from manifolds, the gas fed to the pocket 7 via the feed hole 8 conveniently being at the same pressure as that fed to the orifices 3, 12. The orifices 3, 12 serve to provide stability and the journal bearing portion 6 serves to provide lift to the shaft.

The bearing described above with reference to FIG. 1 as well as having a load capacity (270 lbs. for $x=0.4$) increased by a factor of 3.3 for only a 50% increase in horsepower compared with the externally pressurised orifice compensated type as hereinbefore described in column 1, lines 34 to 40 has further merit in that the shaft runs concentrically so that the minimum gap in the bearing is greater and consequently larger manufacturing and assembly tolerances can be used.

The operation of the bearing shown in the drawings has been described with the outside of the bearing at atmospheric pressure. The bearing can of course be operated in a pressurised system (such as a gas cooled nuclear reactor for example) by arranging for a suitable pressure supply to the orifices 3, 12 and pocket 7 above the pressure of the system. However, a more attractive way of operating in a pressurised system is to modify the bearing by extending its edges as indicated by lines 15, 16 (see FIG. 3 in which like parts to those shown in FIG. 1 are identified by the same reference numerals) and by providing additional grooves 17, 18 and draw off holes 19, 20. The bearing is now inverted (the pocket coming at top); orifices 3, 12 and vents 13 are made open to the pressure system and holes 8, 5, 10, 19 and 20 are joined to a common pipe which is fed to the inlet of a draw-off pump having its outlet open to the pressurised system. In this way the use of manifolds is avoided and nowhere does the pressure exceed that of the pressurised system.

The invention has been described above solely in relation to its use as a journal bearing. It is also envisaged that the journal bearing can be extended to incorporate a further portion which could be described as a "sleeve gland" to prevent escape of gas when the journal bearing is used to support a shaft in passage through the casing of a pressurised system. Such an arrangement is shown in FIGURE 4.

In FIGURE 4 like parts to those shown in FIGURE 1 are identified by the same reference numerals. The journal bearing 1 is shown mounted in a casing 21 by a diaphragm 22. The journal bearing 1 is housed in a cylindrical support member 23 having at one end an integral stepped end plate 24 secured to the journal bearing 1 by screws 25. The member 23 has at its other end a stepped end plate 26 sealed to the journal bearing 1 and to the member 23. The diaphragm 22 has integral ring plates 26, 27, the ring plate 26 being secured to the casing 21 by bolts (indicated by centre lines 28) and the ring plate 27 being secured to a flange 29 on the member 23 by bolts (indicated by centre lines 30). Sealing rings 31, 32 are provided to prevent leakage.

There are eight each of the orifices 3, 12 and the holes 5, 10, 20, all equi-spaced around the journal bearing. The orifices 3 are fed from flange-ended pipes 33 secured in threaded holes in the journal bearing 1 by nuts 34. Similarly the orifices 12 are fed from flange-ended pipes 35 secured in threaded holes in the journal bearing 1 by nuts 36. The pocket 7 is fed via the hole 8 from a flange-ended pipe 37 secured in a threaded hole in the journal bearing 1 by a nut 38. The journal bearing 1 is extended to incorporate an integral sleeve gland portion 39 of length D and having a circumferential groove 40 (distance D/4 from the end of the gland), the groove being provided with a hole 41. The hole 41 is fed from a flange-ended pipe 42 secured in a threaded hole in the journal bearing 1 by a nut 43. A shaft 44 is shown in the journal bearing 1 (the ends of the shaft only being shown so as not to conceal parts of the journal bearing). The pipes 33, 35, 37, 42 pass out through a hole in the end plate 26.

In one application, the casing 21 forms part of a pressurised system such as for example the casing of a compressor for circulating a gas coolant through a nuclear reactor, the shaft 44 being provided for the impeller of the compressor. The shaft 44 is then motor driven from outside the casing 21. For a $CO_2$ cooled reactor at 10 atmospheres pressure, the jets 3, 12 and the pocket 7 are fed with compressed air at 6 atmospheres pressure. The groove 40 and hole 41 are provided to prevent outleakage from the pressurised system. $CO_2$ is fed to the groove 40 via the hole 41 at 11 atmospheres pressure to flow along the journal bearing 1 in both directions, the major part flowing to the groove 18 venting to atmosphere via the holes 20 and a minor part flowing into the pressurised system. In such a system there is no need to provide the groove 17 and holes 19 shown in FIGURE 1 since the corresponding end of the journal bearing 1 is at atmospheric pressure.

I claim:
1. In combination with a shaft and a casing having a port through which the shaft projects, a support arrangement for the shaft comprising a diaphragm sealed around the port, and a hydrostatic gas journal bearing mounted in and penetrating the diaphragm and through which the shaft extends, the hydrostatic gas journal bearing having seven portions in sequence along the bearing from the end of the bearing outside the casing, the first being an externally pressurised orifice compensated journal bearing portion, the second being a circumferential groove with means for controlling the pressure in the groove, the third being a journal bearing portion having means for applying pressure which is circumferentially asymmetric, the fourth being a circumferential groove with means for controlling the pressure in the groove, the fifth being an externally pressurised orifice compensated journal bearing portion, the sixth being a circumferential groove with means for controlling the pressure in the groove, and the seventh being a sleeve gland having a circumferential groove with means for feeding pressurized gas to the groove.

2. A hydrostatic gas journal bearing having a bearing surface for supporting a rotatable shaft fitting in the bearing with a clearance between the bearing surface and the shaft, the bearing having in axial sequence from one end of the bearing: means defining a first circumferential ring of orifices for feeding pressurized gas to said clearance, means defining both a first circumferential groove in the bearing surface and a vent hole for controlling the gas pressure in said clearance, means defining first a pocket in said bearing surface, defining second a hole for feeding the pocket with pressurised gas, and defining third an opening through the bearing opposite the pocket, means defining both a second circumferential groove in the bearing surface and a vent hole for controlling the gas pressure in said clearance, and means defining a second circumferential ring of orifices for feeding pressurised gas to said clearance.

3. A hydrostatic gas journal bearing as claimed in claim 2, wherein there is provided between each circumferential ring of orifices and the corresponding end of the bearing means defining both an additional circumferential groove in the bearing surface and a vent hole for controlling the gas pressure in said clearance.

4. A hydrostatic gas journal bearing as claimed in claim 2, wherin one end of the bearing is extended to incorporate a sleeve gland portion having in sequence from the bearing means defining both a circumferential groove in the bearing surface and a vent hole for controlling the gas pressure in said clearance, and means defining a circumferential groove adapted to be fed with pressurized gas.

5. A hydrostatic gas journal bearing as claimed in claim 2, wherein the pocket is centrally positioned between the circumferential grooves and the circumferential rings of orifices.

6. A hydrostatic gas journal bearing as claimed in claim 3, wherein the pocket is centrally positioned between the circumferential grooves and the circumferential rings of orifices.

References Cited in the file of this patent

UNITED STATES PATENTS

| | | |
|---|---|---|
| 466,645 | Wood | Jan. 5, 1892 |
| 1,900,593 | Wade | Mar. 7, 1933 |
| 2,354,296 | Arms | July 25, 1944 |
| 2,660,484 | Gerard | Nov. 24, 1953 |
| 2,660,485 | Gerard | Nov. 24, 1953 |